(12) United States Patent
Kung et al.

(10) Patent No.: US 10,953,332 B2
(45) Date of Patent: Mar. 23, 2021

(54) ONLINE GAMING PLATFORM VOICE COMMUNICATION SYSTEM

(71) Applicant: Roblox Corporation, San Mateo, CA (US)

(72) Inventors: Jessica Kung, Redwood City, CA (US); Kelly Mayes, San Mateo, CA (US)

(73) Assignee: Roblox Corporation, San Mateo, CA (US)

(*) Notice: Subject to any disclaimer, the term of this patent is extended or adjusted under 35 U.S.C. 154(b) by 0 days.

(21) Appl. No.: 16/228,722

(22) Filed: Dec. 20, 2018

(65) Prior Publication Data
US 2020/0197810 A1 Jun. 25, 2020

(51) Int. Cl.
G06F 17/27 (2006.01)
A63F 13/54 (2014.01)
A63F 13/215 (2014.01)
G10L 15/22 (2006.01)
G10L 15/26 (2006.01)

(52) U.S. Cl.
CPC ............ *A63F 13/54* (2014.09); *A63F 13/215* (2014.09); *G10L 15/22* (2013.01); *G10L 15/26* (2013.01)

(58) Field of Classification Search
CPC .......... A63F 13/12; A63F 13/75; A63F 13/87; A63F 13/424; A63F 2300/572; G10L 15/08; G10L 15/088; G10L 15/26; H04N 21/4542
See application file for complete search history.

(56) References Cited

U.S. PATENT DOCUMENTS

| | | | |
|---|---|---|---|
| 2005/0071481 A1* | 3/2005 | Danieli | A63F 13/12 709/229 |
| 2011/0072039 A1* | 3/2011 | Tayloe | G06F 21/6218 707/769 |
| 2014/0310606 A1 | 10/2014 | Liu et al. | |
| 2014/0358520 A1* | 12/2014 | Davey | G10L 15/08 704/9 |
| 2017/0319958 A1* | 11/2017 | Aronzon | A63F 13/12 |
| 2019/0052471 A1* | 2/2019 | Panattoni | A63F 13/79 |

OTHER PUBLICATIONS

"International Search Report and Written Opinion in International Application No. PCT/US2019/052792", 10 pages.

* cited by examiner

Primary Examiner — Lawrence S Galka
(74) Attorney, Agent, or Firm — IP Spring

(57) ABSTRACT

A method and system is disclosed that permits users of an online gaming platform to communicate via voice with other user in the online gaming platform.

20 Claims, 4 Drawing Sheets

ONLINE GAMING PLATFORM VOICE COMMUNICATION SYSTEM

FIELD

This disclosure relates to the field of communication within an online platform and, in particular, to methods, system and computer readable media for voice communications within an online gaming platform.

BACKGROUND

Online gaming platforms, allow users to connect with each other, interact with each other (e.g., within a game) and share information with each other via the Internet. Users of online gaming platforms may participate in multiplayer gaming environments, design custom gaming environments, decorate avatars, exchange virtual items with other users, communicate with other users, and so forth.

In order to protect the privacy of users and/or to provide a more entertaining gaming experience, voice communications within an online gaming environment may need to include voice audio that is modified so as to obscure the actual sound of a user's voice and/or to change voice audio to reflect a character or avatar of a user within the online gaming environment.

Some implementations were conceived in light of the above-mentioned needs, among other things.

SUMMARY

Some implementations can include a method. The method can include receiving a first voice message associated with a sender user account in an online gaming platform and a recipient user account in the online gaming platform, and programmatically transcribing the first voice message into text. The method can also include identifying one or more restricted portions of the text based on at least one of the sender user account or the recipient user account, and filtering portions of the first voice message that correspond to the one or more restricted portions of the text to obtain a filtered voice message.

The method can further include selectively modifying the filtered voice message to obtain a modified voice message, and providing the modified voice message to a device associated with the recipient user account.

In some implementations, identifying one or more restricted portions of the text can include identifying a portion of the text that includes personally identifiable information associated with at least one user account in the online gaming platform when the sender user account or recipient user account is associated with a threshold user age. In some implementations, identifying one or more restricted portions of the text can include identifying one or more portions of the text corresponding to personally identifiable information when the sender user account is associated with a threshold user age and the recipient user account is not a confirmed acquaintance account of the sender user account within the online gaming platform.

In some implementations, selectively modifying the first voice message can include modifying the first voice message according to a voice chat message overlay that includes parameters for modifying a voice sound of the first voice message to have vocal characteristics associated with a type of the voice chat message overlay. In some implementations, selectively modifying the first voice message includes: retaining original sound of the first voice message if the sender user account is associated with a first threshold user age. In some implementations, selectively modifying the first voice message includes: retaining the original sound of the first voice message if the sender user account is associated with a second threshold user age, the recipient user account includes an indication that one or more other users associated with the recipient user account are confirmed acquaintances of a user associated with the sender user account, or an indication of consent associated with the sender user account is received.

In some implementations, the recipient user account can include a status of: unknown recipient, recipient known to a user associated with the sender user account within the online gaming platform, or recipient known to a user associated with the sender user account outside of the online gaming platform, and wherein the identifying, filtering and selectively modifying are based at least in part on the status of the recipient user account. In some implementations, modifying is performed based on an age associated with the sender user account and an age associated with the recipient user account or parental consent received for the sender user account.

In some implementations, modifying is performed based on an age associated with the sender user account and parental consent received for the sender user account. In some implementations, the modifying can include using a computer generated voice to replace original voice audio in the modified voice message.

In some implementations, modifying can include applying an audio filter to alter a tone of the first voice message, so as to disguise an identifiable sound of a voice of a user associated with the sender user account. In some implementations, modifying using an audio filter can be performed to allow more self expression for users within the online gaming platform, e.g. by providing audio filters and an interface that allows a user to select an audio filter based on creative self expression.

The method can further include determining whether to enable voice chat between the sender user account and the recipient user account based on the sender user account or the recipient user account, and, if it is determined that voice chat is to be enabled, performing the identifying, the filtering, the modifying and the providing.

Some implementations can include a system comprising a memory, and a processing device, coupled to the memory. The processing device is configured to perform operations including receiving a first voice message associated with a sender user account in an online gaming platform and a recipient user account in the online gaming platform, and programmatically transcribing the first voice message into text. The operations can also include identifying one or more restricted portions of the text based on at least one of the sender user account or the recipient user account, and filtering portions of the first voice message that correspond to the one or more restricted portions of the text to obtain a filtered voice message.

The operations can further include selectively modifying the filtered voice message to obtain a modified voice message, and providing the modified voice message to a device associated with the recipient user account.

In some implementations, identifying one or more restricted portions of the text can include identifying a portion of the text that includes personally identifiable information associated with at least one user account in the online gaming platform when the sender user account or recipient user account is associated with a threshold user age. In some implementations, identifying one or more restricted portions of the text can include identifying one or more portions of the text corresponding to personally identifiable information when the sender user account is associated with a threshold user age and the recipient user account is not a confirmed acquaintance account of the sender user account within the online gaming platform.

In some implementations, selectively modifying the first voice message can include modifying the first voice message according to a voice chat message overlay that includes parameters for modifying a voice sound of the first voice message to have vocal characteristics associated with a type of the voice chat message overlay.

Some implementations can include a non-transitory computer-readable medium comprising instructions that, responsive to execution by a processing device, cause the processing device to perform operations. The operations can include receiving a first voice message associated with a sender user account in an online gaming platform and a recipient user account in the online gaming platform, and programmatically transcribing the first voice message into text. The operations can also include identifying one or more restricted portions of the text based on at least one of the sender user account or the recipient user account, and filtering portions of the first voice message that correspond to the one or more restricted portions of the text to obtain a filtered voice message. The operations can further include selectively modifying the filtered voice message to obtain a modified voice message, and providing the modified voice message to a device associated with the recipient user account.

In some implementations, selectively modifying the first voice message can include retaining original sound of the first voice message if the sender user account is associated with a first threshold user age. In some implementations, selectively modifying the first voice message can include retaining the original sound of the first voice message if the sender user account is associated with a second threshold user age, the recipient user account includes an indication that one or more other users associated with the recipient user account are confirmed acquaintances of a user associated with the sender user account, or an indication of consent associated with the sender user account is received.

In some implementations, the recipient user account can include a status of: unknown recipient, recipient known to a user associated with the sender user account within the online gaming platform, or recipient known to a user associated with the sender user account outside of the online gaming platform, and wherein the identifying, filtering and selectively modifying are based at least in part on the status of the recipient user account.

BRIEF DESCRIPTION OF THE DRAWINGS

Various implementations of the disclosure will be understood more fully from the detailed description given below and from the accompanying drawings of various implementations of the disclosure.

DETAILED DESCRIPTION

Online gaming platforms (also referred to as "user-generated content platforms" or "user-generated content systems" herein) offer a variety of ways for users to interact with one another. For example, users of an online gaming platform may work together towards a common goal, share various virtual gaming items, send electronic messages to one another, and so forth. Users of an online gaming platform may play games using characters. An online gaming platform may also allow users of the platform to communicate with each other. For example, users of the online gaming platform may communicate with each other using voice messages (e.g., via voice "chat"), text messaging, video messaging, or a combination of the above.

Voice communications within an online gaming environment may have one or more technical problems. For example, voices of some users (e.g., children or other users that opt for voice privacy) may need to be modified so as to disguise the actual voice of the user. Some implementations of the disclosed subject matter can provide for modified voice to meet the need or request of modifying the voice communications of one or more users. The modification can be performed at the request of a user or performed automatically based on certain criteria associated with the user account (e.g., age of user sending voice message, age of user receiving voice message, parental consent, etc.).

Also, while online game platform users may select an appearance for an avatar representing the user in the online game, it may be desirable to have the voice communications of the user match the appearance of the avatar (e.g., a robot avatar speaks in a robot voice, a pirate avatar speaks in a pirate voice, etc.). Some implementations provide a solution to the technical problem of matching a voice in an online gaming platform with a characteristic of an avatar of a user.

Figure 1:
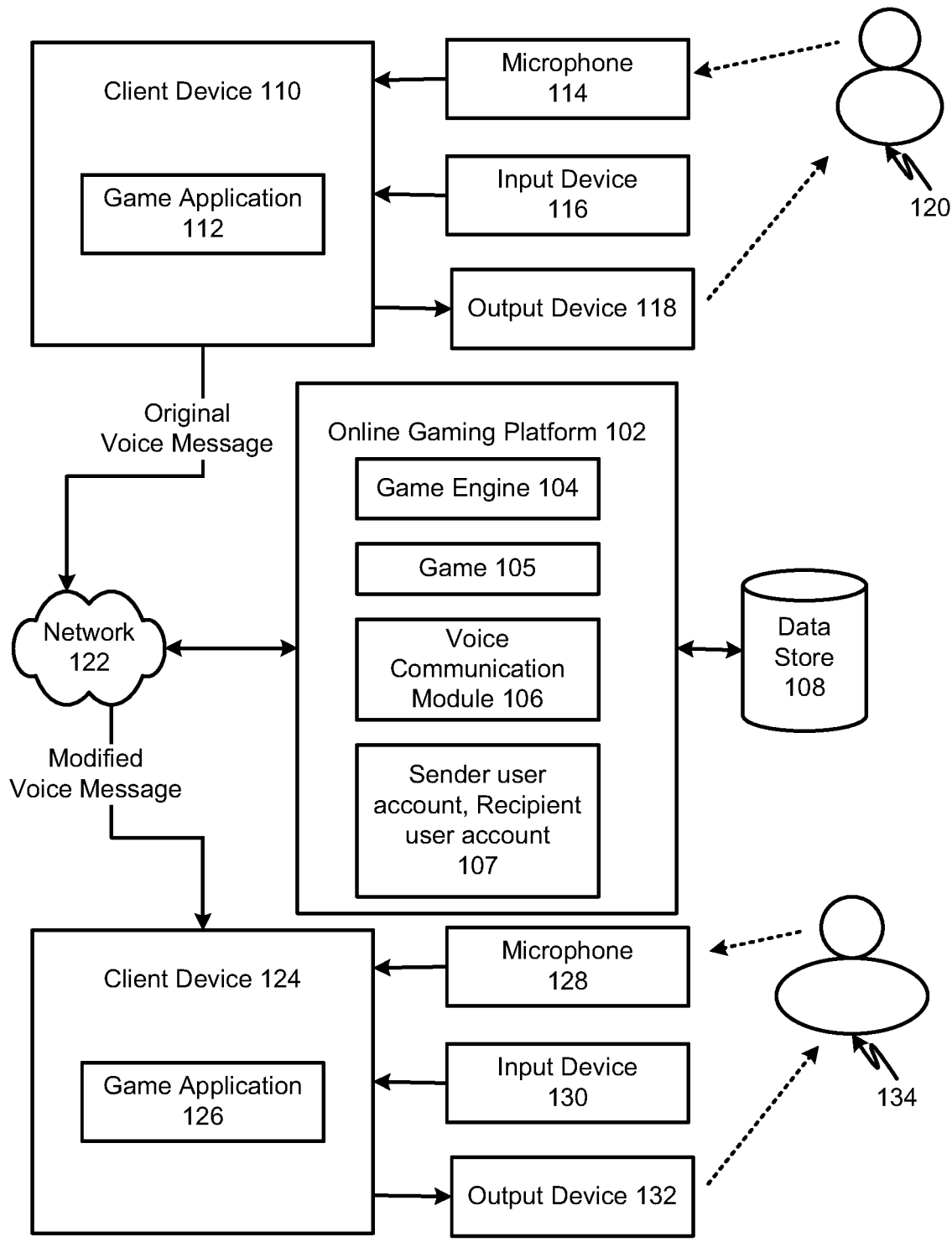
FIG. 1 illustrates an example system architecture for online gaming platform voice communications in accordance with some implementations.

FIG. 1 illustrates an example system architecture 100, in accordance with some implementations of the disclosure. The system architecture 100 (also referred to as "system" herein) includes an online gaming platform 102, a first client device 110 (generally referred to as "client device(s) 110" herein), a network 122, and a second client device 124. The online gaming platform 102 can include, among other things, a game engine 104, one or more games 105, a consent verification application 106, sender user account and/or recipient user account 107, and a data store 108. The client system 110 can include a game application 112 and be coupled to a microphone 114, an input device 116, and an output device 118. The client system 124 can include a game application 126 and be coupled to a microphone 128, an input device 130, and an output device 132.

System architecture 100 is provided for illustration, rather than limitation. In some implementations, the system architecture 100 may include the same, fewer, more, or different elements configured in the same or different manner as that shown in FIG. 1.

In one implementation, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., a webpage) or application back-end software that may be used to provide a user with access to content provided by online gaming platform 102. For example, users may access online gaming platform 102 using the game application 112 on client devices 110.

In some implementations, online gaming platform 102 may be a type of social network providing connections between users or a type of user-generated content system that allows users (e.g., end-users or consumers) to communicate with other users on the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 102 may be a virtual gaming platform. For example, the gaming platform may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players (e.g., 120 and/or 134) with a game (e.g., 105) or the presentation of the interaction on a display or other output device (e.g., 118/132) of a client device 110 or 124.

In some implementations, a game 105 can include an electronic file that can be executed or loaded using software, firmware or hardware configured to present the game content (e.g., digital media item) to an entity. In some implementations, a game application 112 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming platform 102 can host one or more games 105 and can permit users to interact with the games 105 using a game application 112 of client devices 110. Users of the online gaming platform 102 may play, create, interact with, or build games 105, communicate with other users, and/or create and build objects (e.g., also referred to as "item(s)" or "game objects" or "virtual game item(s)" herein) of games 105. For example, in generating user-generated virtual items, users may create characters, decoration for the characters, one or more virtual environments for an interactive game, or build structures used in a game 105, among others. In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications. In some implementations, game objects (e.g., also referred to as "item(s)" or "objects" or "virtual game item(s)" herein) may refer to objects that are used, created, shared or otherwise depicted in game applications 105/112 of the online gaming platform 102. For example, game objects may include a part, model, character, tools, weapons, clothing, buildings, vehicles, currency, flora, fauna, components of the aforementioned (e.g., windows of a building), and so forth.

It may be noted that the online gaming platform 102 hosting games 105, is provided for purposes of illustration, rather than limitation. In some implementations, online gaming platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associated the specific user(s) with a game 102 using user account information (e.g., a user account identifier such as username and password).

In some implementations, online gaming platform 102 or client devices 110 may include a game engine 104 or game application 112. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game engine 104 of client devices 110 may work independently, in collaboration with game engine 104 of online gaming platform 102, or a combination of both.

In some implementations, both the online gaming platform 102 and client device 110 execute a game engine (104, 112, respectively). The online gaming platform 102 using game engine 104 may perform some or all the game engine functions (e.g., generate physics commands, rendering commands, etc.), or offload some or all the game engine functions to game engine 104 of client device 110. In some implementations, each game 105 may have a different ratio between the game engine functions that are performed on the online gaming platform 102 and the game engine functions that are performed on the client device 110. For example, the game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a particular game 105 exceeds a threshold number, the online gaming platform 102 may perform one or more game engine functions that were previously performed by client device 110.

For example, users may be playing a game 105 on client devices 110 and may send control instructions (e.g., user inputs, such as right, left, up, down, user election, or character position and velocity information, etc.) to the online gaming platform 102. Subsequent to receiving control instructions from the client devices 110, the online gaming platform 102 may send gameplay instructions (e.g., position and velocity information of the characters participating in the group gameplay or commands, such as rendering commands, collision commands, etc.) to the client devices 110 based on control instructions. For instance, the online gaming platform 102 may perform one or more logical operations (e.g., using game engine 124) on the control instructions to generate gameplay instruction for the client device 110. In other instances, online gaming platform 102 may pass one or more or the control instructions from one client device 110 to other client devices participating in the game 105. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 102. In other implementations, the control instructions may be sent from a client device 110 to another client device, where the other client device generates gameplay instructions using the local game engine 104. The control instructions may include instructions to play a voice communication message from another user on an audio device (e.g., speakers, headphones, etc.).

In some implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 108. In some implementations, the online gaming platform 102 maintains a character catalog and game catalog that may be presented to users via. In some implementations, the game catalog includes images of games stored on the online gaming platform 102. In addition, a user may select a character (e.g., a character created by the user or other user) from the character catalog to participate in the chosen game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming platform 102 at any given moment. It may be noted that the number of client devices 110 is provided as illustration, rather than limitation. In some implementations, any number of client devices 110 may be used.

In some implementations, each client device 110 may include an instance of the game application 112. In one implementation, the game application 112 may permit users to use and interact with online gaming platform 102, such as control a virtual character in a virtual game hosted by online gaming platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming platform application for users to build, create, edit, upload content to the online gaming platform 102 as well as interact with online gaming platform 102 (e.g., play games 105 hosted by online gaming platform 102). As such, the game application may be provided to the client device 110 by the online gaming platform 102. In another example, the game application may be an application that is downloaded from a server.

In some implementations, a user may login to online gaming platform 102 via the game application. The user may access a user account by providing user account information (e.g., username and password) where the user account is associated with one or more characters available to participate in one or more games 105 of online gaming platform 102.

In general, functions described in one implementation as being performed by the online gaming platform 102 can also be performed by the client device(s) 110, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include a voice communication module 106. In some implementations, the voice communication module 106 may be a system, application, or module that permits the online gaming platform 102 to provide voice communications between users, for example between a sender user (e.g., 120) via the client device 110 and a recipient user (e.g., 134) via client device 124. In some implementations, the voice communication module 106 may perform one or more of the operations described below in connection with the flowcharts shown in FIG. 2.

Figure 2:
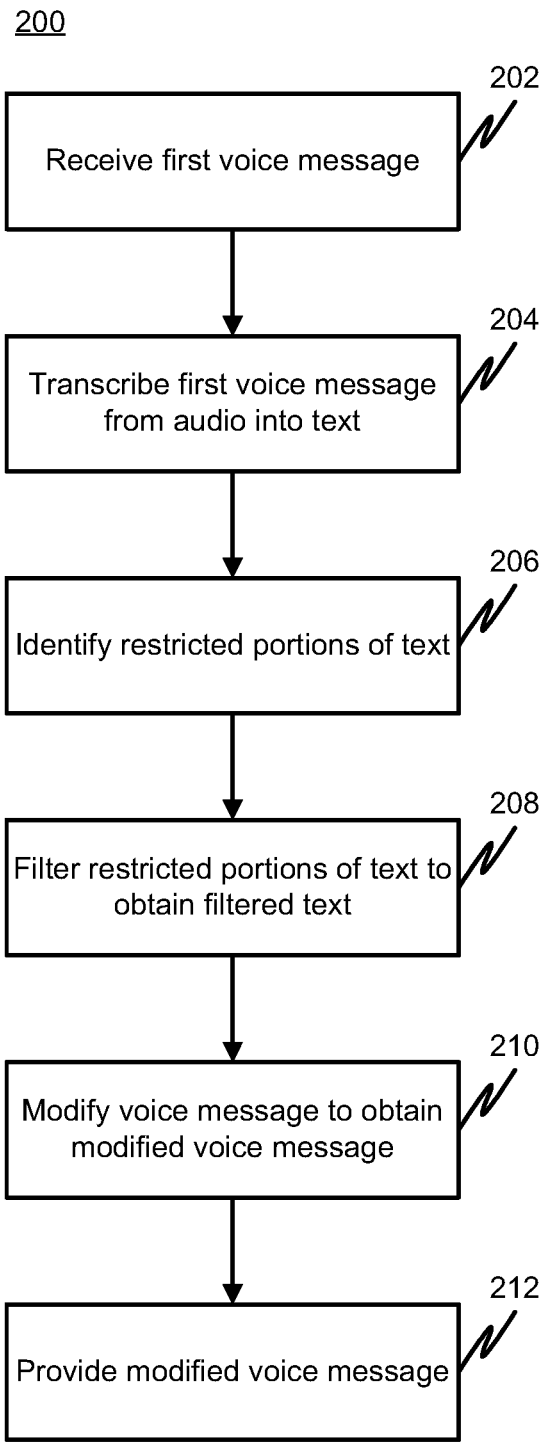
FIG. 2 is a flowchart illustrating an example method for voice communication on an online gaming platform in accordance with some implementations.

FIG. 2 is a flow diagram illustrating method 200 for voice communication on an online gaming platform, in accordance with implementations of the disclosure. Method 200 may be performed by processing logic that includes hardware (e.g., circuitry, dedicated logic, programmable logic, microcode), software (e.g., instructions run on a processing device to perform hardware simulation), or a combination thereof. In some implementations, messaging module 128 executing at online gaming platform 120 may perform some or all the operations. In other implementations, messaging module 128 executing at online gaming platform 120, client device 110A, client device 110B, server 130 or combination thereof may perform some or all the operations. It may be noted that the in some implementations, method 200 may include the same, different, fewer, or a greater number of operations performed in any order.

At block 202 of method 200, processing logic performing method 200, receives a first voice message associated with a sender user account in an online gaming platform, the first voice message associated with a recipient user account in the online gaming platform. For example, the platform may receive a voice message from a sender user associated with a sender user account. The voice message can include information (e.g., metadata such as sender account, etc.) of one or more recipient users associated with respective recipient user accounts. The voice message can be obtained from a microphone (e.g., on a headset) or other device on a system being used by the sending user. The voice message may be a portion of a continuous voice conversation such as a voice chat, or a recorded voice message sent asynchronously, etc. Processing continues to 204.

At block 204, the first voice message is programmatically transcribed into text. For example, the platform may utilize voice recognition technology to transcribe the voice message into text or data representing text. Processing continues to 206.

At block 206, any restricted portions of the text are identified. Restricted portions can include an inappropriate phrase having text with one or more words or phrases that are restricted according to the policies of use established by the platform operator (e.g., no curse words, no hateful speech, no cyber bullying, etc.). Restricted portions can also include text that includes personally identifiable information such as full name, address, phone number, last name, relatives names, school attended, etc. Further, what constitutes a restricted portion can be based on one or more of the sender user account or the recipient user account. For example, if the sender user account and the recipient user accounts are both associated with adult players, then the standard for restricted portions may be different than that applied to accounts associated with younger players (e.g., minors). A threshold for determining restricted content or inappropriate phrases can be based on one or more factors that may include, e.g., frequency of word usage in communications (restricted or unrestricted), age of the associated sender or recipient account, location, cultural or other demographic identity, or gender. Characteristics (e.g., age, parental control settings, etc.) of the sender user account and one or more of the recipient user accounts can be used to determine whether portions of the text are restricted or not. For example, some implementations can include a list of restricted phrases, words, idioms, etc. An list of unrestricted close-sounding words can also be used (e.g., "duck" may be an unrestricted message in a shoot-em-up style game or boxing game as an instruction to a playing partner, but may get confused for restricted content of a curse word). In some implementations, the speech-to-text engine can be trained to be specific to a particular game context (e.g., to bias more towards recognizing in-game commands/context such as "duck," "shoot," "hide," etc. when words such as "puck" "hoot" "wide" are detected with some error). Other considerations for determining restricted text can include online safety aspects based on industry best practices and/or government regulations, online privacy protection (especially for minors) in accordance with industry best practices and/or government regulations.

Also, identifying one or more restricted portions of the text can include identifying a portion of the text that includes personally identifiable information when the sender user account is associated with a threshold user age (e.g., younger than 13 years old). In some implementations, identifying one or more restricted portions of the text can include identifying one or more portions of the text corresponding to personally identifiable information when the sender user account is associated with a threshold user age (e.g., 13 years old or younger) and the recipient user account does not include an indication that one or more other users associated with the recipient user account are confirmed acquaintances of a user associated with the sender user account. A confirmed acquaintance can include a user that has been confirmed to be a known acquaintance of the sender user (e.g., the confirmed acquaintance is able to provide authentication information that suggests the confirmed acquaintance knows the sender user such as an email address of the sender user, phone number of the sender user, etc.).

In some implementations, a third party service can be used to filter text based on various factors (e.g., regular expressions and age-restricted dictionaries). The third party service can be certified by a user online safety certification provider (e.g., by KidSafe, etc.). Each phrase sent in a communication can have a risk rating associated with the respective phrase. The risk rating can be used to determine whether the corresponding phrase gets filtered or not. The risk rating can reflect personally identifiable information as well as other age inappropriate content (e.g. curse words, sexual terms, etc.). Some implementations can include a smart filter that will be based on machine learning to augment other approaches such as regular expressions and dictionaries.

A mapping of the restricted portions of the text to the voice message can be maintained and include references relating the restricted portions with the audio data of the voice message (e.g., data associating the restricted portion with certain time or data positions of the audio file). Processing continues to 208.

At block 208, portions of the first voice message corresponding to the one or more restricted portions of the text are filtered to obtain a filtered voice message. Filtering can include removing or deleting the restricted portions. In some implementations, personally identifiable information is not stored. In some implementations, personally identifiable information that may be stored is deleted at the request of a user corresponding to such information. Filtering can also include replacing restricted portions with a replacement portion that is similar (or not similar) and renders the portion unrestricted. For example, if a portion of the text containing a curse word is detected and marked as a restricted portion, that portion could be replaced with a word having a similar meaning but without being an actual curse word. In another example, if a restricted portion is determined to contain an address (e.g., "I live at 123 Main St"), the system could replace the address with something unrestricted and equivalent without restricted content (e.g., "I live on Earth"). In some implementations, restricted terms or phrases could be placed selectively with non-restricted terms or phrases (e.g., via a 1:1 mapping of specific restricted terms and their replacements). Processing continues to 210.

At block 210, the filtered voice message is modified to obtain a modified voice message. The audio data corresponding to the filtered voice message can be processed to modify the sound of the audio (e.g., change the tone, pitch, tempo, and/or or sound qualities of the audio) to obtain a modified voice message. Audio signal processing techniques can be used to modify the voice message. In some implementations, the modification can be performed by using a computer generated voice to generate an audio message from the filtered voice message.

Modifying the filtered voice message can include modifying the filtered voice message according to a voice chat message overlay that includes parameters for modifying a voice sound of the filtered voice message to have vocal characteristics associated with a type of the voice chat message overlay. For example, if the overlay is a pirate character overlay (or "skin") then the vocal characteristics can include the vocal characteristics commonly associated with pirates. In some implementations, a library of vocal characteristics and corresponding speech synthesis code may be provided, e.g., that can render text in various voices such as pirate, cute, doll, mugger, and other voices. In some implementations, filtering the voice messages includes applying effects on top of an existing voice audio portion (e.g., changing the pitch, adding more reverb, etc.).

In some implementations, modifying can include using a computer generated voice to generate the modified voice message. In some implementations, modifying can include using a voice filter process to alter a sound of the first voice message so as to obscure an identifiable sound of a voice of a user associated with the sender user account. The modifying can include one or more of pitch shifting, and adding reverb, echo, distortion, chorus, equalizer, amplification, and/or flanger.

In some implementations, modifying the filtered voice message can include retaining original voice sound of the first voice message if the sender user account is associated with a first threshold user age (e.g., over 18 years old, etc.), and retaining the original voice sound of the filtered voice message if the sender user account is associated with a second threshold user age (e.g., 13 years old), the recipient user account includes an indication that one or more other users associated with the recipient user account are confirmed acquaintances of a user associated with the sender user account, or an indication of consent (e.g., parental consent) associated with the sender user account is received. Processing continues to 212.

At block 212, the modified voice message is provided to a device associated with the recipient user account. For example, the modified voice message is played on a speaker or headphones of a device being used by the user associated with the recipient user account.

For voice messaging purposes (or other purposes), the recipient user account can include a status indication of one of a plurality of statuses including: unknown recipient, recipient known to a user associated with the sender user account within the online gaming platform, or recipient known to a user associated with the sender user account outside of the online gaming platform (e.g., based on prior input received from the sender user and stored within the online gaming platform), and wherein the identifying, filtering and modifying are based at least in part on the status of the recipient user account.

In some implementations, the decision to modify voice messages can be based on an age associated with the sender user account and one or more of an age associated with the recipient user account or parental consent received for the sender user account.

In some implementations, enabling voice chat or voice communications can be based on the sender user account or the recipient user account, and, if voice chat is enabled, performing the identifying, the filtering, the modifying and the providing.

Figure 3:
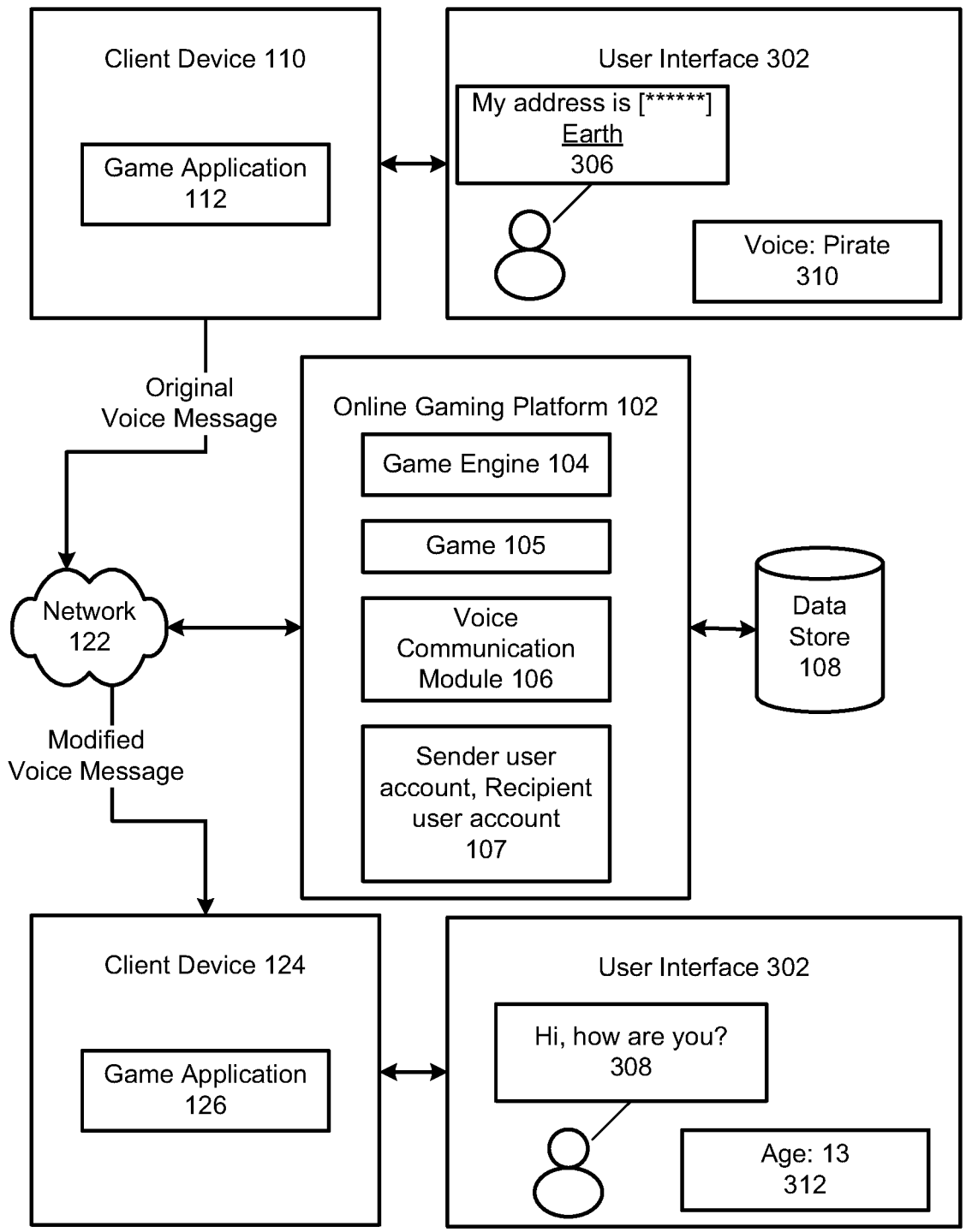
FIG. 3 is a diagram illustrating user interfaces and voice communication in accordance with implementations of the disclosure.

FIG. 3 is a diagram showing an example sender and receiver user interface and corresponding client systems. In particular FIG. 3 shows a sender user interface 302 displayed by a sender client device 110 coupled to the online gaming platform 102 via a network 122 and a recipient user interface 304 displayed by a recipient client device 124.

Within the user interfaces 302 and 304 are shown elements, 306 and 308, respectively (e.g., speech bubbles), having restricted and unrestricted text. For example, speech bubble 306 includes restricted text (indicated by asterisks) having been replaced with unrestricted text (the word "earth"). Speech bubble 308 shows unrestricted text. While restricted and unrestricted text is shown printed in FIG. 3 for illustration purposes, the text could also be played out as an audio signal (e.g., though headphones or a speaker). Also shown is an element 310 to select the voice filter being used for the respective user's voice communications (e.g., pirate voice filter). Users can select a voice communication filter to use manually or can have a voice communication filter automatically selected and applied as part of an avatar appearance package (or skin). The user interfaces can also include a display of parameters such as age 312 that can be used in voice communication filtering determinations as discussed herein. In some implementations, for inappropriate content (e.g., swear words, personally identifiable information, etc.) there can be a visual indication (e.g., system message in the UI) to let the speaking user know that their message is being filtered. In another example, for users who selected a voice filter as part of an avatar skin, the system can show a separate indication to indicate that the user is speaking with a fun voice filter.

Figure 4:
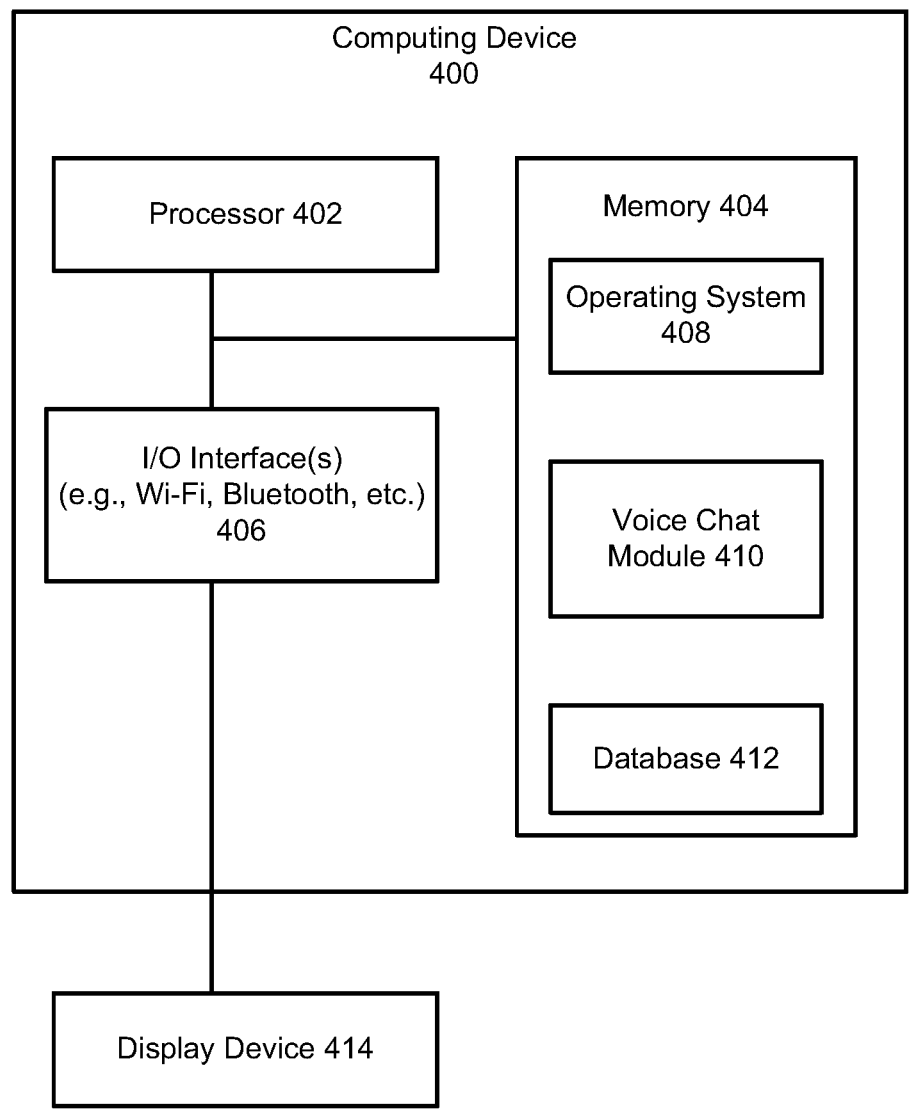
FIG. 4 is a block diagram illustrating an exemplary computing device in accordance with some implementations.

FIG. 4 is a block diagram of an example computing device 400 which may be used to implement one or more features described herein. In one example, device 400 may be used to implement a computer device, (e.g., 102, 110, and/or 124 of FIG. 1), and perform appropriate method implementations described herein. Computing device 400 can be any suitable computer system, server, or other electronic or hardware device. For example, the computing device 400 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 400 includes a processor 402, a memory 404, and input/output (I/O) interface 406.

Processor 402 can be one or more processors and/or processing circuits to execute program code and control basic operations of the device 400. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 608, one or more applications 410, e.g., a voice communication (or voice chat) application and application data 412. In some implementations, application 410 can include instructions that enable processor 402 to perform the functions described herein, e.g., some or all of the method of FIG. 2.

For example, applications 410 can include a voice chat (or voice communication) application or module 412, which as described herein can provide voice communication within an online gaming platform (e.g., 102). Any of software in memory 404 can alternatively be stored on any other suitable storage location or computer-readable medium. In addition, memory 404 (and/or other connected storage device(s)) can store instructions and data used in the features described herein. Memory 404 and any other type of storage (magnetic disk, optical disk, magnetic tape, or other tangible media) can be considered "storage" or "storage devices."

I/O interface 406 can provide functions to enable interfacing the server device 400 with other systems and devices. For example, network communication devices, storage devices (e.g., memory and/or data store 108), and input/output devices can communicate via interface 406. In some implementations, the I/O interface can connect to interface devices including input devices (keyboard, pointing device, touchscreen, microphone, camera, scanner, etc.) and/or output devices (display device, speaker devices, printer, motor, etc.). Display device 414 is one example of an output device that can be used to display graphical user interfaces (e.g., such as those shown in FIG. 3). Display device 414 can be connected to device 400 via local connections (e.g., display bus) and/or via networked connections and can be any suitable display device, some examples of which are described below.

For ease of illustration, FIG. 4 shows one block for each of processor 402, memory 404, I/O interface 406, and software blocks 408 and 410. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While the online gaming platform 102 is described as performing operations as described in some implementations herein, any suitable component or combination of components of online gaming platform 102 or similar system, or any suitable processor or processors associated with such a system, may perform the operations described.

A user device can also implement and/or be used with features described herein. Example user devices can be computer devices including some similar components as the device 400, e.g., processor(s) 402, memory 404, and I/O interface 406. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 414, for example, can be connected to (or included in) the device 400 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method comprising:
   receiving a first voice message associated with a sender user account in an online gaming platform and a recipient user account in the online gaming platform;
   programmatically transcribing the first voice message into text;
   identifying one or more restricted portions of the text based on at least one of the sender user account or the recipient user account;
   filtering portions of the first voice message that correspond to the one or more restricted portions of the text to obtain a filtered voice message;
   selectively modifying the filtered voice message to obtain a modified voice message; and
   providing the modified voice message to a device associated with the recipient user account,
   wherein the recipient user account has a status of: unknown recipient, recipient known to a user associated with the sender user account within the online gaming platform, or recipient known to a user associated with the sender user account outside of the online gaming platform, and wherein the identifying, the filtering, and the selectively modifying are based at least in part on the status of the recipient user account.

2. The method of claim 1, wherein identifying one or more restricted portions of the text includes identifying a portion of the text that includes one or more of an inappropriate phrase or personally identifiable information.

3. The method of claim 1, wherein identifying one or more restricted portions of the text includes identifying one or more portions of the text corresponding to personally identifiable information when the sender user account is associated with a threshold user age and the recipient user account is not a confirmed acquaintance account of the sender user account within the online gaming platform.

4. The method of claim 1, wherein selectively modifying the first voice message includes modifying the first voice message according to a voice chat message overlay that includes parameters for modifying a voice sound of the first voice message to have vocal characteristics associated with a type of the voice chat message overlay.

5. The method of claim 1, wherein selectively modifying the first voice message includes:
   retaining original sound of the first voice message if the sender user account is associated with a first threshold user age.

6. The method of claim 5, wherein selectively modifying the first voice message includes:
   retaining the original sound of the first voice message if the sender user account is associated with a second threshold user age, the recipient user account includes an indication that one or more other users associated with the recipient user account are confirmed acquaintances of a user associated with the sender user account, or an indication of consent associated with the sender user account is received.

7. The method of claim 1, wherein the selectively modifying is performed based on an age associated with the sender user account and an age associated with the recipient user account or parental consent received for the sender user account.

8. The method of claim 1, wherein the selectively modifying is performed based on an age associated with the sender user account and parental consent received for the sender user account.

9. The method of claim 1, wherein the selectively modifying includes using a computer generated voice to replace original voice audio in the modified voice message.

10. The method of claim 1, wherein the selectively modifying includes applying an audio filter to alter a tone of the first voice message, so as to disguise an identifiable sound of a voice of a user associated with the sender user account.

11. The method of claim 1, further comprising determining whether to enable voice chat between the sender user account and the recipient user account based on the sender user account or the recipient user account, and, if it is determined that voice chat is to be enabled, performing the identifying, the filtering, the selectively modifying and the providing.

12. A system comprising:
    a memory; and
    a processing device, coupled to the memory, the processing device configured to perform operations including:
       receiving a first voice message associated with a sender user account in an online gaming platform and a recipient user account in the online gaming platform;
       programmatically transcribing the first voice message into text;
       identifying one or more restricted portions of the text based on at least one of the sender user account or the recipient user account;
       filtering portions of the first voice message that correspond to the one or more restricted portions of the text to obtain a filtered voice message;
       selectively modifying the filtered voice message to obtain a modified voice message; and
       providing the modified voice message to a device associated with the recipient user account,
       wherein identifying one or more restricted portions of the text includes identifying one or more portions of the text corresponding to personally identifiable information when the sender user account is associated with a threshold user age and the recipient user account is not a confirmed acquaintance account of the sender user account within the online gaming platform.

13. The system of claim 12, wherein identifying one or more restricted portions of the text includes identifying a portion of the text that includes one or more of an inappropriate phrase or personally identifiable information.

14. The system of claim 12, wherein selectively modifying the first voice message includes modifying the first voice message according to a voice chat message overlay that includes parameters for modifying a voice sound of the first voice message to have vocal characteristics associated with a type of the voice chat message overlay.

15. The system of claim 12, wherein the recipient user account has a status of: unknown recipient, recipient known to a user associated with the sender user account within the online gaming platform, or recipient known to a user associated with the sender user account outside of the online gaming platform, and wherein the identifying is based at least in part on the status of the recipient user account.

16. The system of claim 12, wherein the operations further comprise determining whether to enable voice chat between the sender user account and the recipient user account based on the sender user account or the recipient user account, and, if it is determined that voice chat is to be enabled, performing the identifying, the filtering, the selectively modifying, and the providing.

17. A non-transitory computer-readable medium comprising instructions that, responsive to execution by a processing device, cause the processing device to perform operations comprising:
    receiving a first voice message associated with a sender user account in an online gaming platform and a recipient user account in the online gaming platform;
    programmatically transcribing the first voice message into text;
    identifying one or more restricted portions of the text based on at least one of the sender user account or the recipient user account;
    filtering portions of the first voice message that correspond to the one or more restricted portions of the text to obtain a filtered voice message;
    selectively modifying the filtered voice message to obtain a modified voice message; and
    providing the modified voice message to a device associated with the recipient user account,
    wherein the recipient user account has a status of: unknown recipient, recipient known to a user associated with the sender user account within the online gaming platform, or recipient known to a user associated with the sender user account outside of the online gaming platform, and wherein the identifying is based at least in part on the status of the recipient user account.

18. The non-transitory computer-readable medium of claim 17, wherein selectively modifying the first voice message includes:
    retaining original sound of the first voice message if the sender user account is associated with a first threshold user age.

19. The non-transitory computer-readable medium of claim 18, wherein selectively modifying the first voice message includes:
    retaining the original sound of the first voice message if the sender user account is associated with a second threshold user age, the recipient user account includes an indication that one or more other users associated with the recipient user account are confirmed acquaintances of a user associated with the sender user account, or an indication of consent associated with the sender user account is received.

20. The non-transitory computer-readable medium of claim 17, wherein identifying one or more restricted portions of the text includes identifying one or more portions of the text corresponding to personally identifiable information when the sender user account is associated with a threshold user age and the recipient user account is not a confirmed acquaintance account of the sender user account within the online gaming platform.

* * * * *